United States Patent [19]

Liskov et al.

[11] 4,259,738

[45] Mar. 31, 1981

[54] MULTIPLEXER SYSTEM PROVIDING IMPROVED BIT COUNT INTEGRITY

[75] Inventors: Nathan A. Liskov, Waltham; David L. Hendry, Framingham, both of Mass.

[73] Assignee: Raytheon Company, Lexington, Mass.

[21] Appl. No.: 40,247

[22] Filed: May 18, 1979

[51] Int. Cl.³ .............................................. H04J 3/06
[52] U.S. Cl. ................................................. 370/102
[58] Field of Search ...................................... 370/102

[56] References Cited

U.S. PATENT DOCUMENTS

| | | | |
|---|---|---|---|
| 2,958,727 | 11/1960 | Barbeau | 178/23 |
| 3,504,287 | 3/1970 | Deregnaucourt | 370/102 |
| 3,526,875 | 9/1970 | Jourdan | 340/146.1 |
| 3,753,225 | 8/1973 | Liddell | 340/146.1 |
| 3,873,773 | 3/1975 | Guy | 370/102 |
| 3,970,796 | 7/1976 | Gyürkl | 370/102 |
| 3,980,835 | 9/1976 | Mitchell | 370/102 |

*Primary Examiner*—David L. Stewart
*Attorney, Agent, or Firm*—William R. Clark; Milton D. Bartlett; Joseph D. Pannone

[57] ABSTRACT

A multiplexer system providing a transmission frame field containing information derived from the cumulative total of stuff bits used over a plurality of frames. The stuff bits which also have assigned positions in the transmission frame are generally used in asynchronous systems to compensate for the input data rate of a group not being a fixed submultiple of the transmission rate. The demultiplexer system uses the information derived from the cumulative total to improve the bit count integrity performance of data channeled out to a user device. Also, during transmission fade conditions, the demultiplexer uses information derived from the frequency of past stuff operations to maintain group bit count close to its expected value.

16 Claims, 5 Drawing Figures

| GROUP 1 DATA 9 | GROUP 1 STUFF CODE 9 | GROUP 1 STUFF BITS 2 | GROUP 1 CUM TOTAL 8 | OTHER FIELDS |

MULTIPLEXER SYSTEM PROVIDING IMPROVED BIT COUNT INTEGRITY

BACKGROUND

In general, the two categories of multiplexers are synchronous and asynchronous. Both types combine two or more serial data streams called groups into a single higher rate serial data stream called a supergroup. In a synchronous multiplexer, each group is assigned a fixed fraction of the bits in the supergroup. Thus, if a supergroup output rate is 10 kilobits per second and a group input rate is 1 kilobit per second, exactly one-tenth of the supergroup bits would come from that group. In order to provide uninterrupted operation with a synchronous multiplexer, the data rate of each group must be maintained in an exact ratio with the data rate of the supergroup. This is usually achieved by phase-locking the data rate frequency of each group with a submultiple of the supergroup data rate frequency.

In some applications, it is impractical to phase-lock the group clocks to the supergroup clock. In these applications, an asynchronous multiplexer is generally used. Because a group rate is not necessarily a fixed fraction of the supergroup rate in an asynchronous multiplexer, it is not known exactly how many bits that group will contribute to a frame of the supergroup. Conventionally, this uncertainty may be compensated for through the use of so-called stuff bits. More specifically, the group rate is generally specified to be within a certain range of several hundred parts-per-million of a center frequency. Accordingly, because the lowest possible frequency of the group clock is known, the fewest number of bits contributed by a group to a supergroup frame can be determined. In other words, it is known how many bits of a group will always be transmitted as part of a supergroup frame and these bits are assigned data bit positions in the frame. If the group clock frequency is higher than the lowest frequency of its range, additional bits must be transmitted for that particular group. These bits are called stuff bits and data bit positions in the supergroup frame are assigned for them. Enough data bit positions must be assigned to accommodate for the group clock frequency being at the upper end of its specified range. It follows that depending on the frequency of the group clock rate, the stuff bit positions in the frame may or may not be used for group data. Because the demultiplexer must provide only the stuffed data bits from these bit positions to a particular device, the multiplexer must also send a code in the supergroup output indicating whether the frame data bit positions assigned to the stuff bits have been used or not.

Certain multiplexer-demultiplexer applications such as, for example, tropospheric-scatter communication links are subject to periodic fades, that is, intervals in which the bit error rate is significantly poorer than the long term average. During the fade, data may be lost or garbled but what is more important is that after the fade, the bit count integrity must be achieved. Bit count integrity on the group means that the number of bits received in the group at the demultiplexer is equal to the number of bits transmitted in that group at the multiplexer over a given interval of time. Loss of the bit count integrity of group data is very undesirable. Many user types of equipment generally used with demultiplexer must go through a lengthy resynchronization procedure when the bit count integrity is lost. In some cases, this resynchronization must be initiated manually. The net effect of bit count integrity losses is to substantially reduce the percentage of time a communication link is available.

With a synchronous demultiplexer, the bit count integrity of the groups is maintained as long as the bit count integrity is maintained on the supergroup. This is because each group rate is a fixed ratio of the supergroup rate. These ratios are designed into the demultiplexer and do not depend on the transmission of information from the multiplexer. With an asynchronous demultiplexer, however, the bit count integrity of a group is dependent both on the bit count integrity of the supergroup, and on the correct interpretation of stuff codes which are subject to transmission errors. Accordingly, previous asynchronous demultiplexers were not suited for an environment where severe fades result in the incorrect interpretation of the stuff codes.

SUMMARY

The invention discloses means for transferring digital bits from a first serial data stream to assigned bit positions in a predetermined time interval of a second higher rate serial digital data stream wherein the transferring means comprises control means that is responsive to the data rate of the first data stream with respect to the data rate of the second data stream and wherein the invention includes means for providing a number derived from the number of bits transferred during a plurality of the predetermined time intervals. It may be preferable that the transferring means comprises a selector. It may also be preferable that the control means comprises a read only memory such as a PROM and an up/down counter. The providing means may comprise a counter which is used to store and accumulate the number derived from the number of bits transferred during a plurality of the predetermined time periods. Typically, the time periods are referred to in the art as frames.

More specifically, the invention may be practiced in a multiplexer system comprising means for storing digital bits from a first serial digital data stream, means for transferring the bits from the first storing means to assigned bit positions in a second higher rate serial data stream, said transferring means comprising means for controlling the number of bits transferred during a predetermined time interval, said control means being responsive to the number of bits in the storing means, and means for providing a number derived from the number of bits transferred during a plurality of said predetermined time intervals. Once again, the time intervals are commonly referred to as frames. It may be preferable that the storing means comprise a first-in, first-out memory device. It may also be preferable that the transferring means comprise a selector such as commonly used in multiplexers to select from a plurality of data inputs. Further, it may be preferable that the control means comprise a read only memory such as a PROM and an up/down counter configured so as to indicate the degree of occupancy of the storing means. Finally, it may be preferable that the providing means comprise a counter such as an up/down counter.

Further, the invention may be used to advantage in a multiplexer-demultiplexer system to provide improved bit count integrity over prior art systems. It may comprise in combination a first storing means for storing digital bits from a first serial digital data stream, means for transferring the bits from the first storing means to bit positions in a second higher rate serial digital data stream, said bit positions being assigned for bits in addition to a predetermined number of bits always transferred during a predetermined time interval, said transferring means comprising means for controlling the number of bits transferred to said bit positions, said control means being responsive to the number of bits stored in the first storing means, means for providing a number derived from the number of bits transferred to the bit positions during a plurality of said predetermined time intervals, second storing means for storing said derived number, said transferring means comprising means for transferring the derived number from the second storing means to the second serial digital data stream, means for providing first serial digital data bits from the second serial digital data stream to an output channel, and means responsive to said derived number for maintaining bit count integrity to said channel. It may be preferable that the maintaining means comprise means for predicting an expected number which is based on previous derived numbers. Therefore, during a transmission fade condition, the maintaining means may be responsive to the expected number rather than the derived number. It may be preferable that the first storing means comprise a first-in, first-out memory. It may also be preferable that the transferring means comprise a selector. Further, it may be preferable that the controlling means comprise a read only memory such as a PROM and an up/down counter. The providing means may also comprise an up/down counter. Finally, the responsive means may comprise a microprocessor.

BRIEF DESCRIPTION OF THE DRAWINGS

The foregoing and other objects and advantages of the invention will be understood more fully in the following detailed description thereof with reference to the accompanying drawings wherein.

DESCRIPTION OF THE PREFERRED EMBODIMENT

A brief description will first be given of the operation of the system embodying the invention without reference to any of the figures. As explained in detail in the Background herein, asynchronous multiplexers conventionally use stuff bits for the individual groups because the group clocks are not phase-locked to the supergroup clock. The stuff bit method provides a means of maintaining the flow of group data through the multiplexer without data backing up above a tolerable limit. A stuff code, which is part of the supergroup frame, informs the demultiplexer whether the stuff bit positions in the frame contain data or not. It is important that the demultiplexer only channel the correct number of data bits to the user devices or else the devices will lose bit count integrity and will require resynchronization. In the system embodying the invention, the multiplexer transmits for each group in addition to the stuff code, a number referred to as the cumulative total. The cumulative total is incremented each time a stuff bit is used; it is decremented if it is not. Thus, it represents a past history of stuff operation. During a fade, the demultiplexer will still perform stuff operations incorrectly. However, once the fade has ended, the cumulative totals sent by the multiplexer provide inputs to the demultiplexer so that it can correct the number of stuff bits for each group and restore the bit count integrity of each group. Further, in order to prevent the need for a large number of corrections to the user devices, the demultiplexer updates a rate memory every time a stuff bit is used. When a fade occurs, this information is used by the demultiplexer to add stuff bits at approximately the correct frequency. As a result, the demultiplexer will not have to correct a large number of bits once the fade has ended.

The combination of cumulative totals and rate memory provides consistent bit count integrity fade-bridging for a 0.5 bit error rate fade for as long as four seconds for the embodiment described herein. When a fade ends, the bit count integrity is usually restored within several milliseconds after the bit error rate improves to $10^{-2}$ or better. On a system level, this provides a major performance improvement over systems without fade-bridging.

Figure 1A:
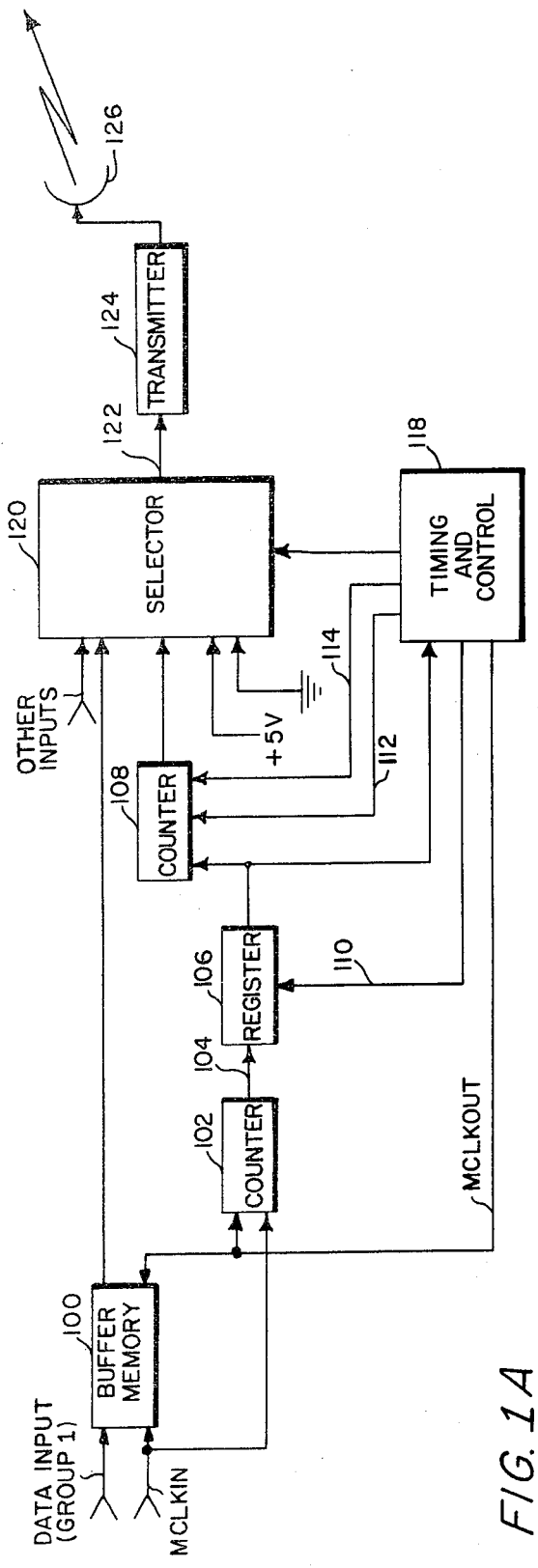
FIG. 1A is a functional block diagram of a multiplexer system embodying the invention.
Figure 1B:
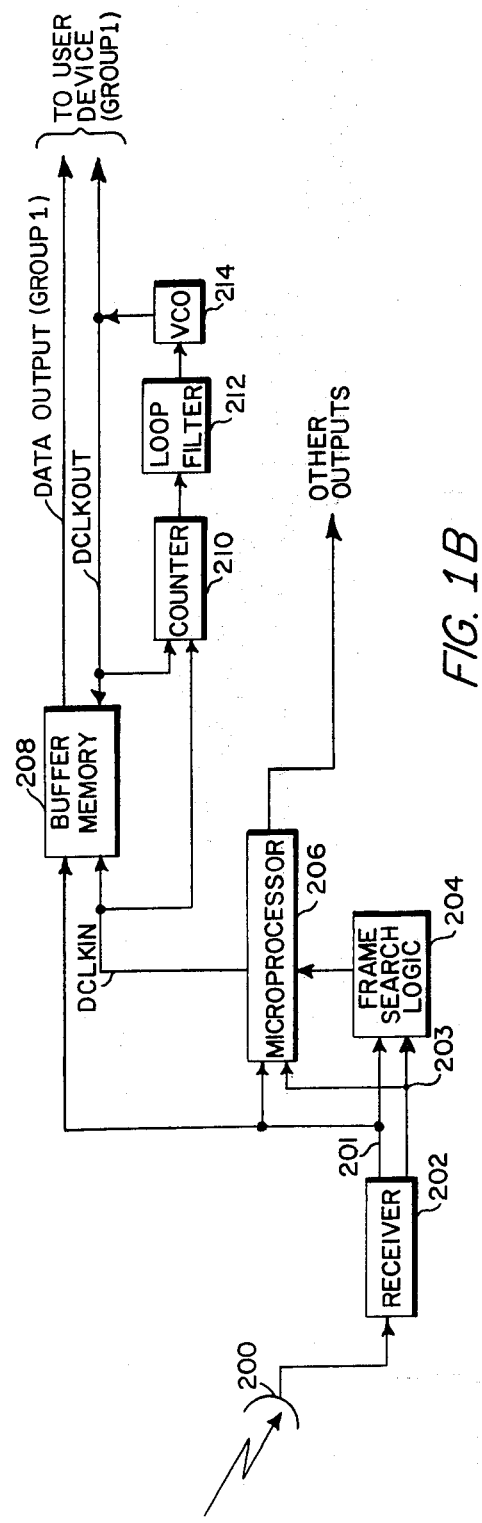
FIG. 1B is a functional block diagram of a demultiplexer system utilizing the invention to advantage.

Referring to FIGS. 1A and 1B, there is shown a block diagram of a multiplexer (FIG. 1A) and demultiplexer (FIG. 1B) system using the invention to advantage. In FIG. 1A, the data input (Group 1) consists of a serial digital data stream (group) which preferably is to be multiplexed with other data streams for transmission to a demultiplexer. The system hereinafter described provides an improvement over the prior art in maintaining bit count integrity of the group at the demultiplexer even though the device coupling data to data input is asynchronous. That is to say, the improvement is provided even when the data rate of the group is not a fixed ratio of the rate of the transmitted data, a characteristic which is usually achieved in synchronous multiplexers by phase-locking the two rates. Although a plurality of input data rates could be used with minor modifications to the system, the discussion hereinafter will assume that the group is clocked into buffer memory 100 by multiplexer clock in (MCLKIN) having a frequency of 1.544 MHz±200 parts per million and provided by the input device (not shown). Buffer memory 100 is preferably a first-in, first-out memory such as, for example, a Fairchild 9403 which provides storage for 64 bits. This memory is provided as a buffer because the group input rate may not be an integer submultiple of the multiplexer transmission rate. Furthermore, because of overhead in the transmission frame and the desirability of providing flexibility in the frame composition, the group is generally not clocked into selector 120 at a constant rate. Data bits in buffer memory 100 are strobed out by multiplexer clock out (MCLKOUT) from timing and control 118. A detailed description of the derivation of MCLKOUT is given with reference to FIG. 3. For purposes here, however, the number of clock pulses in MCLKOUT for a relatively long time interval must be approximately the same as the number of clock pulses in MCLKIN. Otherwise, buffer memory 100 would either become empty or overflow. The balance of data bits in buffer memory 100 is maintained through the use of stuff bits. More specifically, when buffer memory 100 fills up above a predetermined level (normally half full), bits called stuff bits are clocked into assigned bit positions in a transmission frame; these stuff bits are in addition to the number of bits of the group that are always included in the frame. Conversely, when buffer memory 100 is filled below a predetermined level, no additional bits are clocked out of buffer memory 100 into the frame and the bit positions assigned for stuff bits are not used.

Counter 102 functions as an occupancy detector for buffer memory 100. Preferably, counter 102 is a conventional up/down type with the up count being triggered by MCLKIN and the down being triggered by MCLKOUT. Accordingly, when the occupancy of buffer memory 100 is high caused by relatively more MCLKIN pulses than MCLKOUT pulses, the value in counter 102 will be relatively high. Conversely, when the occupancy of buffer memory 100 is low caused by relatively more MCLKOUT pulses than MCLKIN pulses, the value in counter 102 will be relatively low. The output of counter 102 on line 104 is the most significant bit of counter 102 which indicates whether counter 102 is greater than half full. With a counter having a 64 count capacity, the most significant bit also indicates whether buffer memory 100 is greater than half full; a logic 1 on line 104 therefore indicates that buffer memory 100 is greater than half full.

The most significant bit of counter 102 on line 104 is connected to register 106 which preferably comprises a flip-flop device. Its function is to hold buffer memory 100 occupancy information provided by the most significant bit from counter 102 and couple it to counter 108 and timing and control 118. The strobing of the most significant bit into register 106 is controlled by pulses on line 110 from timing and control 118 which will be described in detail with reference to FIG. 3. For purposes here, however, the strobe preferably occurs once for each transmission frame.

As stated, the output of register 106 is coupled to two different devices. First, because this bit is indicative of the occupancy of buffer memory 100 and is related to whether stuff bits are required or not, the output is connected to timing and control 118. Although timing and control 118 will be discussed in detail with reference to FIG. 3, register 106 output is connected as an address bit of a programmable read only memory (PROM) within timing and control 118. A program in the PROM determines whether stuff bits from buffer memory are selected for transmission as part of the transmission frame. Timing and control 118 controls selector 120 which transfers serial data from buffer memory 100 to the transmit data channel 122. Timing and control 118, as mentioned earlier herein, also provides MCLKOUT which strobes data out of buffer memory 100.

Counter 108 is the second device to which the output of register 106 is transferred. Preferably, counter 108 consists of an up/down counter which increments when register 106 output is a logical 1 and decrements when it is a logical 0. Accordingly, the content of counter 108 is a cumulative total of the number of bit stuff operations performed by timing and control 118 on the data in buffer memory 100. The count pulses for counter 108 are received from timing and control 118 on line 112. The terminals of counter 108 are connected such that after the contents are serially clocked out by clocking pulses on line 114 from timing and control 118, the initial contents are restored.

Figures 2, 3:
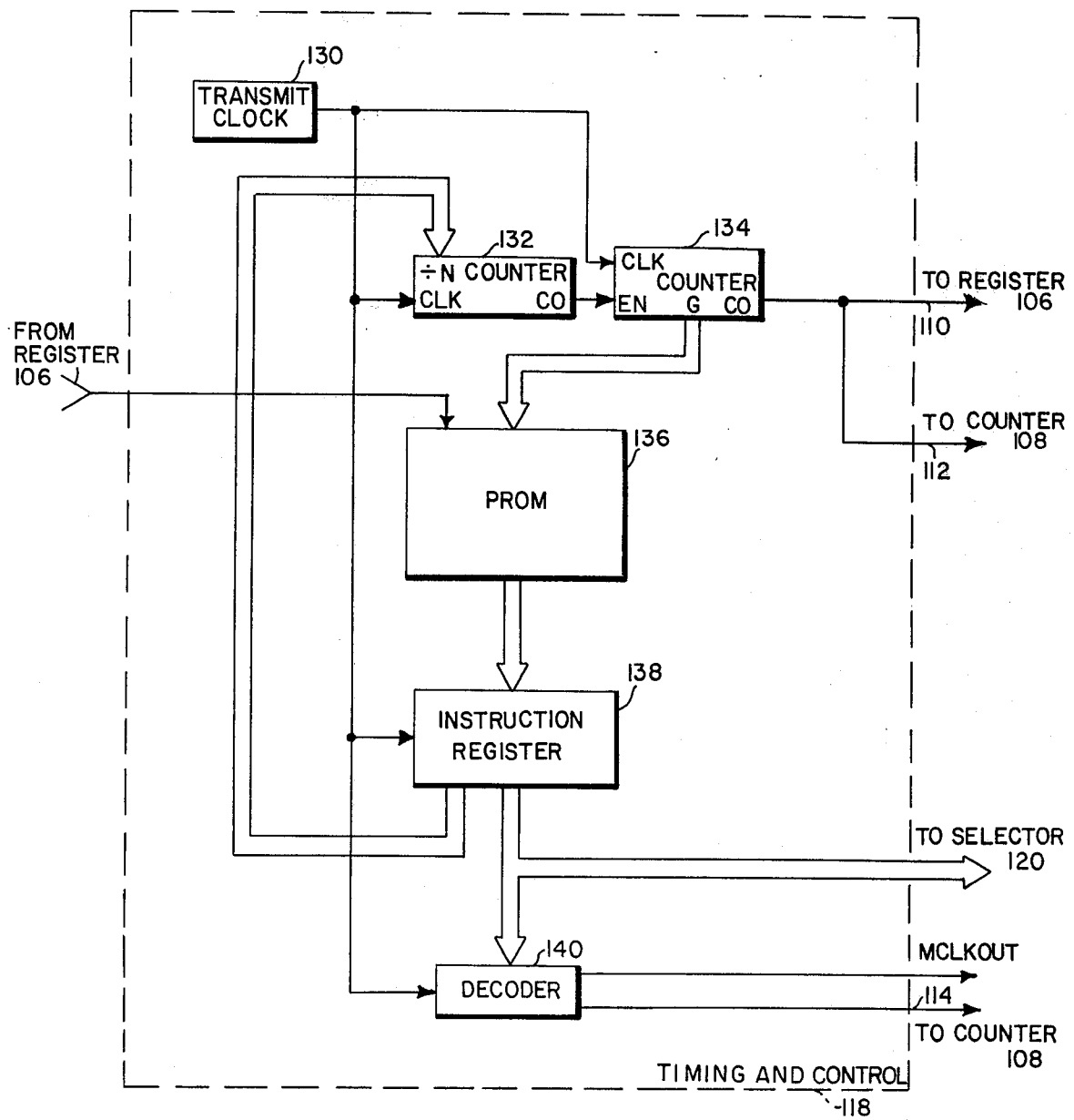
FIG. 2 is an example of a transmission frame of the multiplexer system of FIG. 1A showing various fields of the frame.
FIG. 3 is a functional block diagram of timing and control 118 as shown in FIG. 1A.

Referring to FIG. 2, an example of a transmission frame is shown which will make the foregoing discussion more easily understood. It should be appreciated that the frame is for illustration only and that in actual operation some of the depicted fields would be much larger and more complex and other fields would be present. In particular, the frame format in the preferred embodiment, operating at the data rate previously described is quite different. However, the essential features of the frame format in the preferred embodiment and the frame format shown in FIG. 2 are identical. First assume that for the group 1 MCKLIN frequency at the low end of its specified range, a minimum of 9 bits of group 1 will be available for inclusion in the transmission frame. Therefore, during the time period designated group 1 in FIG. 2, timing and control 118 provides a logical input to selector 120 so that buffer memory 100 is selected. Further, timing and control provides 9 MCLKOUT pulses to buffer memory 100 to clock 9 data bits selector 120 to the transmit data channel on line 122. Next, as determined by the output of register 106 which is indicative of the occupancy of buffer memory 100, timing and control provides logic control inputs to selector 120 to select either +5 volts or ground for a time interval equivalent to 9 bit positions in the transmission frame. The +5 volts is selected if group 1 data bits are to be stuffed into group 1 stuff bit positions and 0 volts is selected if they are not. This interval provides the stuff code as labeled in FIG. 2. Next, after providing logic to selector 120 so that buffer memory 100 is selected, timing and control either provides 2 or 0 MCLKOUT pulses to buffer memory 100, respectively depending on whether the stuff code was +5 volts (logical 1) or 0 volts (logical 0). If the clock pulses are provided, the two data bits from group 1 in buffer memory 100 are transferred through selector and appear in the frame bit positions labeled group 1 stuff bits. If the clock pulses are not provided, the group 1 stuff bit positions are not used in the frame. In next sequence, related to the invention, timing and control provides logic control to selector so that counter 108 is selected. During this interval, timing and control provides 8 clock pulses to counter 108 on line 114 so that 8 serial bits representing the cumulative total of stuff operations are transferred to the transmit data channel. The other fields in the transmit frame typically would consist of other inputs of other groups and frame overhead. The output of selector 120 is transferred to transmitter 124 such as used in conventional tropospheric-scatter communication links. The transmitter would typically be coupled to antenna 126.

Referring to FIG. 3, a block diagram of timing and control 118 is shown. The transmit clock 130 operates at 3.5 MHz and is coupled to ÷N counter 132, counter 134, decoder 140, and instruction register 138. When enabled by the carry out from ÷N counter, counter 134 counts at a 3.5 MHz rate with its individual bits providing address lines for sequencing through instructions in PROM 136. Also provided as an address bit to PROM 136 is the bit held in register 106 which is indicative of whether data bits are to be stuffed into their appropriate bit positions in the transmission frame. The programming of PROM 136 is a task that is well known to one skilled in the art. More specifically, the contents of a location addressed in PROM is clocked into instruction register 138 by transmit clock 130. Further, the bits of the instruction register provide logic control to selector 120, decoder 140, and ÷N counter 132. Accordingly, for example, referring to the transmission frame shown in FIG. 2, for the first 9 counts of the transmit clock, it is preferable that the 3 least significant bits of the addressed location provide a code whereby selector 120 selects Group 1 data from buffer memory 100 and decoder 140 provides 9 MCLKOUT pulses to buffer memory 100. Two bits connected from instruction register 138 to ÷N counter 132 may be used to set ÷N equal to 9 so that the carry out from ÷N counter only enables counter 134 after nine clock pulses. Accordingly, during the first 9 counts of the frame in FIG. 2, only one location in PROM is addressed, thus simplifying the programming and reducing the program storage requirement. For bits 10 through 18 of the transmit frame, an instruction must be addressed that provides decoder 140 with control bits that select either +5 volts or 0 volts depending on whether the address bit from register 106 is respectively a logical 1 or 0. For the nineteenth and twentieth transmit clock pulses of a frame, the address bit from register 106 is used to determine whether the logic to decoder 140 provides stuff bits by strobing buffer memory 100 with two MCLKOUT pulses. Also, for bits 21 through 28 of the transmit frame, an instruction must be addressed that selects the cumulative total from counter 108 and decoder must provide 8 clocking pulses to that device on line 114. Once again, for the above instructions, the two most significant bits of the instruction may be used to determine the number of clock pulses that the same instruction will be used. In the preferred embodiment, a PROM with a storage capacity of 512 8-bit words was used. This provided sufficient program storage to accommodate, in addition to group 1, the other inputs and frame overhead. A PROM of any size sufficient to accomplish the particular design task could be used. The system is designed so that counter 134 begins at a fixed count for each frame and a carry out clocking pulse is provided to register 106 and counter 108 once each frame. It may be preferable that the clocking pulse to counter 108 is delayed by one count.

Referring to FIG. 1B, a block diagram of the demultiplexer at the tropospheric-scatter receiver site is shown. The transmissions from the transmitter site are incident on conventional antenna 200 which is coupled to conventional receiver 202. The output of the receiver which is the transmitted supergroup serial data stream is coupled to frame search logic 204, microprocessor 206, and buffer memory 208 on line 201. Also, the receiver provides the transmit clock of 3.5 MHz to the microprocessor and frame search logic on line 203.

The function of frame search logic 204, as well known in the art, is to provide a synchronization pulse to the microprocessor at the appropriate time. Although not shown in the transmission frame example of FIG. 2, a frame code is transmitted; this code is decoded by frame search logic which provides one pulse each frame to the microprocessor to maintain sync on the frame. Typically, frame search logic 204 comprises a shift register having the individual bits connected to a comparator such that the dynamic contents of the shift register are compared to a predetermined frame code. It may be preferable that frame search logic is inhibited by microprocessor 206 during a fade as defined hereinafter.

The microprocessor 206 operates at the same clock rate as the transmitted data. Specifically, that is 3.5 megabits per second. A Raytheon Company model 2901A microprocessor is preferably used although a number of other commerically available microprocessors would satisfy the high speed and data handling requirements. As stated, the microprocessor receives as inputs the transmitted data, the data rate (transmit) clock, and the synchronization pulse from frame search logic. It provides as an output the demultiplexer clock in (DCLKIN) for buffer memory 208. In addition, it may provide data clocks for other outputs or groups derived from other inputs in FIG. 1A. The programming of the microprocessor is a task well known to one skilled in the art given the task description below.

The overall purpose of the microprocessor is to provide clocking pulses so that the data bits of the supergroup will be demultiplexed into their appropriate channels. Referring specifically to the group 1 path in FIG. 1B, the microprocessor's function is to provide DCLKIN to buffer memory 208 synchronous to data on line 201 such that the data is clocked into buffer memory 208 with bit count integrity. Once again, the microprocessor maintains frame sync with the use of a sync pulse from frame search logic 204. Referring again to FIG. 2, the microprocessor first provides 9 sequential DCLKIN pulses to buffer memory 208 simultaneous to the respective 9 serial data bits labeled group 1 data being on line 201. This clocks the data into buffer memory 208. Next, the microprocessor examines the 9 bit stuff code to determine if bits 19 and 20 of the frame were used or unused for stuff data. If the code is a majority of logical 1's indicating stuff bits, the microprocessor provides 2 sequential DCLKIN pulses simultaneous to those respective bit positions in the frame. If the bit positions were unused for data, the 2 DCLKIN pulses are not provided. Following this, the microprocessor increments or decrements its stuff code cumulative total accordingly. Next, the microprocessor performs the fade-bridging and rate memory algorithms which are more easily understood with reference to the software flow diagram shown in FIG. 4.

Figure 4:
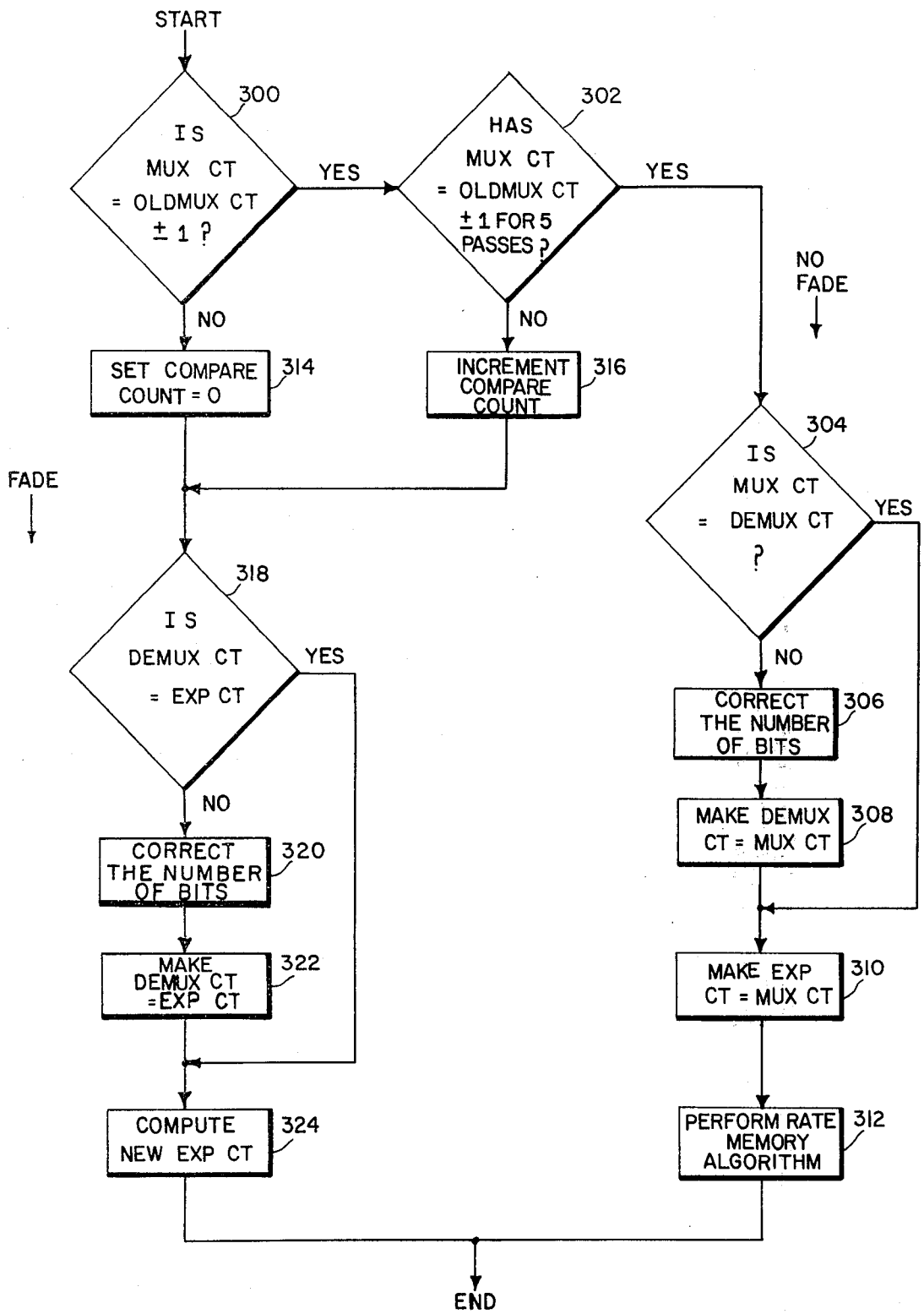
FIG. 4 is a software flow diagram of the fade-bridging and rate memory algorithms performed by microprocessor 206 as shown in FIG. 1B.

Referring to FIG. 4, the logical variables include MUX CT, OLDMUX CT, DEMUX CT and EXP CT. MUX CT is the cumulative total of stuff operations transmitted from the multiplexer in the Group 1 CUM TOTAL field of the current frame (see FIG. 2). OLDMUX CT is the stored MUX CT from the previous frame. DEMUX CT is the demultiplexer cumulative total of actual stuff operations performed by the demultiplexer on data being clocked into buffer memory 208 by DCLKIN. EXP CT is the expected cumulative total of stuff operations that the demultiplexer would predict based on having the same stuff rate during a fade as was observed prior to that fade. If the demultiplexer determines that a fade is occurring, then DEMUX CT or the local bit count is kept in agreement with EXP CT or the expected bit count. If no fade is occurring, then the demultiplexer may or may not make corrections to the bit count based on whether MUX CT or the received bit count agrees with DEMUX CT or the actual local bit count. Accordingly, the first step at the start of the flow diagram of FIG. 4 is to determine if a fade condition exists or not. This is done in blocks 300 and 302 by determining if there is consistency in the received MUX CTs over the past 5 frames. Specifically, in block 300, MUX CT is compared to OLDMUX CT to see if they differ by other than 1; if they compare favorably, then in block 302, the comparisons for the previous four frames are examined. If over the past five comparisons the respective cumulative totals agree within 1, it is assumed that the tropospheric-scatter communication link is in a non-fade status. In such case, in block 304, a determination is made if MUX CT is equal to DEMUX CT. If they differ, it is indicative one or more bit stuff codes have been incorrectly interpreted at the demultiplexer and in block 306, the appropriate number of bits are either added to or "deleted" from buffer memory 208 to restore the correct bit count integrity. Bits are added by providing DCLKIN pulses to buffer memory 208 which do not clock in valid data but correct the bit count integrity. Bits are "deleted" by providing less than 9 DCLKIN pulses for the Group 1 data bit positions in the next transmission frame; it is noted that although valid data bits are dropped, their interpretation by the user device would be invalid anyway without bit count integrity. Following the bit count integrity correction, DEMUX CT is made equal to MUX CT in block 308 and the program flow merges with where it would have been had MUX CT equaled DEMUX CT. Next, EXP CT is made equal to MUX CT in block 310. The next sequence in this non-fade branch is to perform the rate memory algorithm in block 312. The purpose of the algorithm is to provide an EXP CT which can be used instead of MUX CT during long fades so as to minimize the bit count integrity correction when the fade ends. EXP CT represents a history of the frequency that the multiplexer performed stuff operations. More specifically, it is calculated from the number of frames that it took the MUX CT to increment or decrement by 64 during non-fade periods. After block 312, the program flow goes to the end of the processing for group 1 and begins processing for other fields of the transmission frame.

Referring back to blocks 300 and 302 of FIG. 4, if MUX CT and OLDMUX CT for either the present frame or the previous four frames differ by other than 1, a fade condition is indicated. If the noncomparison was in the present frame, the compare count, which is the number of consecutive comparisons having a difference of 1, is set to zero in block 314. If it was one of the past 4 frames that exhibited a noncompare, compare count is incremented in block 316. Then, the two branches merge. Next, because the system is in a fade status, DEMUX CT is compared to EXP CT instead of MUX CT in block 318. The derivation of EXP CT was described with reference to block 312. If DEMUX CT is not equal to EXP CT, bits are either added to or "deleted" from buffer memory 208 in block 320 in similar manner to the discussion of block 306. Following this, the DEMUX CT is updated to equal EXP CT in block 322. Next, the output of block 322 merges with a positive comparison from block 318 and in block 324, a new EXP CT is computed from data taken in the non-fade status of block 312. From the output of block 324, the program processing moves to end of this subroutine and to other fields.

As a result of the above-described fade-bridging and rate memory algorithms, the system provides an improvement over the prior art in maintaining bit count integrity of group 1 data clocked into buffer memory 208. It is noted that the microprocessor would typically provide clocking pulses for other groups to be demultiplexed from the supergroup.

Referring again to FIG. 1B, the purpose of counter 210, loop filter 212, and voltage controlled oscillator (VCO) 214 is to provide a demultiplexer clock out (DCLKOUT) for buffer memory 208 that is at a relatively constant rate and maintains the buffer memory 208 occupancy at approximately half full. If DCLKOUT were too fast a rate, buffer memory 208 would empty; if it were too slow, buffer memory 208 would overflow. Similar to counter 102 described with reference to FIG. 1A, counter 210 functions as an occupancy detector. With a count capacity for 64 counts, which is the same number of storage locations in first-in, first-out buffer memory 208, the most significant bit of counter 210 indicates whether buffer memory 208 is more than half full. More specifically, when buffer memory 208 is more than half full, the most significant bit of counter 210 is a logical 1 and when it isn't, the most significant bit is a logical 0. The most significant bit of counter 210 is connected to loop filter 212 which is a conventional design network of resistor-capacitor (RC) circuits. Its function is to prevent short-term buffer memory 208 occupancy variations from affecting the output frequency of VCO 214. Because the number of stuff bit corrections following a fade is minimized by the use of the rate memory algorithm described with reference to FIG. 4, the requirement for large variations in occupancy of buffer memory 208 is also minimized. Accordingly, the loop filter used provides a relatively fast time constant on the order of 200 milliseconds. The output of loop filter 212 provides the control voltage for conventional VCO 214. The output of VCO is the demultiplexer clock out (DCLKOUT) which clocks data out of buffer memory 208 and also is provided to the group 1 user device to clock data in.

Although the described application of this invention has been made with reference to a tropospheric-scatter communicaton link, the reading of this disclosure by those skilled in the art will lead to various modifications and alterations within and without the described application without departing from the spirit and scope of the invention. For example, within the application, the embodiment described has been with reference to an asynchronous multiplexer using stuff bits which is commonly called a stuff-only multiplexer. Similarly, there are spill-only and stuff/spill techniques where so called spill bits are used. Spill-only systems are based on using the maximum (instead of minimum) group rate and providing a spill code in the transmission frame which is indicative of whether the spill bit positions are used or discarded. Stuff/spill systems are usually implemented to transmit the group at its nominal center data rate. The invention described with reference to stuff-only systems is also applicable to and of advantage in spill-only and stuff/spill systems. It is intended, therefore, that the embodiment shown and described herein be considered as exemplary only and that the scope of the invention be limited only by the appended claims.

APPENDIX

Parts List

| Reference No. | Manufacturer | Type |
|---|---|---|
| 100, 208 | Fairchild | 9403 |
| 102, 108, 210 | Texas Instrument | SN54LS169A |
| 106, 132, 134 | Texas Instrument | SN54LS161A |
| 120 | Texas Instrument | SN54LS151 |
| 136 | Monolithic Memories | 5341-1 |
| 138 | Texas Instrument | SN54LS377 |
| 140 | Texas Instrument | SN54LS138 |
| 206 | Raytheon | AM2901A |

What is claimed is:
1. In combination:
means for transferring digital bits from a first serial digital data stream to assigned bit positions in a predetermined time interval of a second higher rate serial digital data stream, said bit positions being assigned for bits in addition to a predetermined number of bits of said first data stream always transferred during a predetermined time interval;

said transferring means comprising means responsive to the data rate of said first data stream with respect to the data rate of said second data stream for controlling the number of bits transferred into said bit positions;

means for providing a number derived from the number of bits transferred to said bit positions during a plurality of said predetermined time intervals;

means for deriving said first serial data stream from said second data stream comprising means responsive to said derived number for maintaining bit count integrity of said first serial data stream; and said maintaining means comprising means for predicting an expected number based on previous derived numbers.

2. The combination in accordance with claim 1 wherein said transferring means comprises a selector.

3. The combination in accordance with claim 2 wherein said control means comprises a read only memory.

4. The combination in accordance with claim 3 wherein said control means further comprises an up/-down counter.

5. The combination in accordance with claim 4 wherein said providing means comprises a counter.

6. A multiplexer system comprising in combination:

means for storing digital bits from a first serial digital data stream;

means for transferring bits from said storing means to assigned bit positions in a second higher rate serial data stream, said bit positions being assigned for bits in addition to a predetermined number of bits from said storing means always transferred during a predetermined time interval;

said transferring means comprising means for controlling the number of said bits transferred to said bit positions during a predetermined time interval;

said control means being responsive to the number of said bits stored in said storing means;

means for providing a number derived from the number of said bits transferred to said bit positions during a plurality of said predetermined time intervals;

means for deriving said first serial data stream from said second data stream comprising means responsive to said derived number for maintaining bit count integrity of said first serial data stream; and said maintaining means comprising means for predicting an expected number based on previous derived numbers.

7. The combination in accordance with claim 6 wherein said storing means comprises a first-in, first-out memory.

8. The combination in accordance with claim 7 wherein said transferring means comprises a selector.

9. An asynchronous multiplexer-demultiplexer system providing improved bit count integrity and comprising in combination:

first storing means for storing digital bits from a first serial digital data stream;

means for transferring said bits from said first storing means to bit positions in a second higher rate serial digital data stream, said bit positions being assigned for bits in addition to a predetermined number of said bits always transferred during a predetermined time interval;

said transferring means comprising means for controlling the number of bits transferred to said bit positions;

said control means being responsive to the number of said bits stored in said first storing means;

means for providing a number derived from the number of said bits transferred to said bit positions during a plurality of said predetermined time intervals;

second storing means for storing said derived number;

said transferring means comprising means for transferring said derived number from said second storing means to said second serial digital data stream;

means for providing said first serial digital data bits from said second serial digital data stream to an output channel; and means responsive to said derived number for maintaining bit count integrity to said channel comprising means for predicting an expected number based on previous derived numbers.

10. The combination in accordance with claim 9 wherein said maintaining means comprises means responsive to said expected number for determining the number of data bits provided to said output channel during a transmission fade.

11. The combination in accordance with claim 10 wherein said first storing means comprises a first-in, first-out memory.

12. The combination in accordance with claim 11 wherein said transferring means comprises a selector.

13. The combination in accordance with claim 12 wherein said controlling means comprises a read only memory.

14. The combination in accordance with claim 13 wherein said control means further comprises an up/-down counter.

15. The combination in accordance with claim 14 wherein said second storing means comprises an up/-down counter.

16. The combination in accordance with claim 15 wherein said determining means comprises a microprocessor.

* * * * *